March 13, 1956     I. JEPSON     2,738,073
FILTER ASSEMBLY
Filed March 9, 1950     2 Sheets-Sheet 1
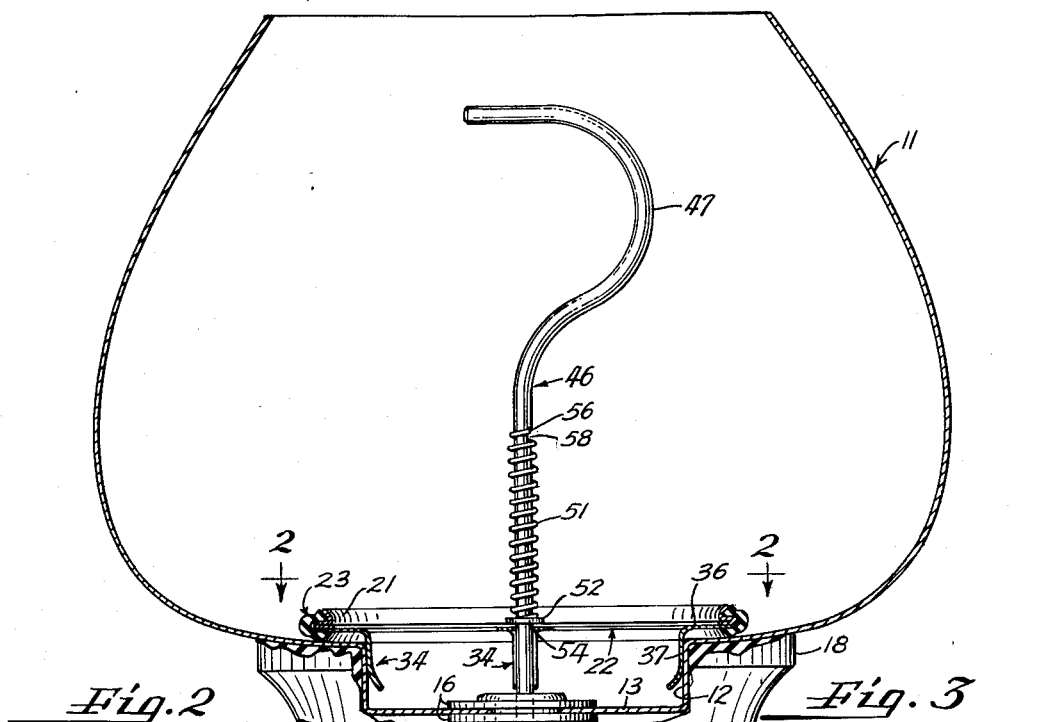
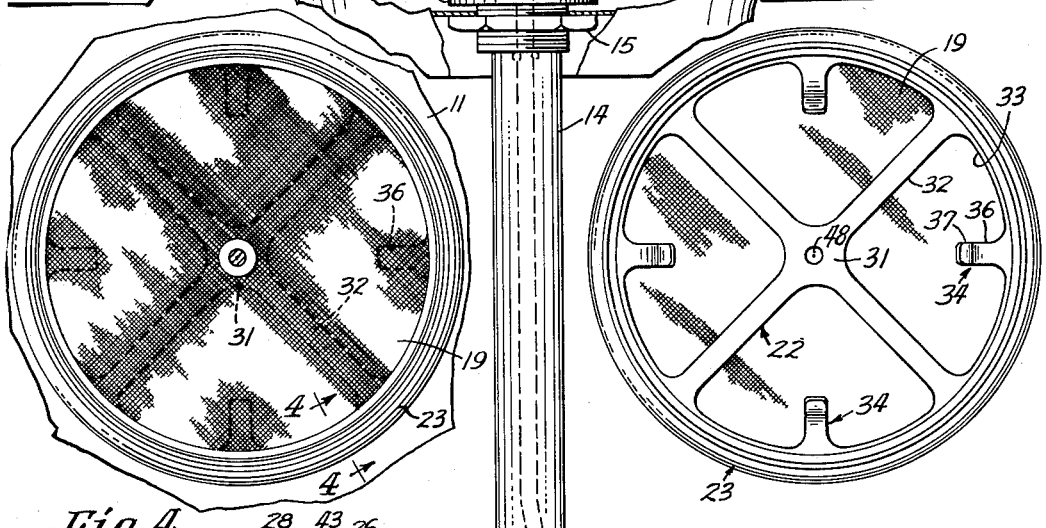
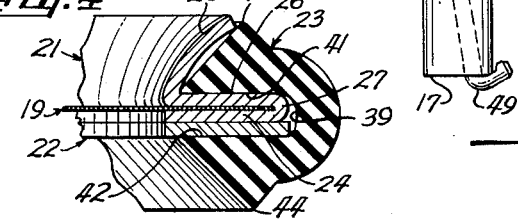

March 13, 1956     I. JEPSON     2,738,073
FILTER ASSEMBLY
Filed March 9, 1950     2 Sheets—Sheet 2

Inventor
Ivar Jepson
By McCanna & Morsbach
Attys.

United States Patent Office 2,738,073
Patented Mar. 13, 1956

2,738,073
FILTER ASSEMBLY

Ivar Jepson, Oak Park, Ill., assignor to Sunbeam Corporation, Chicago, Ill., a corporation of Illinois Application March 9, 1950, Serial No. 148,583

6 Claims. (Cl. 210—162)

This invention relates to filters and more particularly to filters for coffee makers of the vacuum type.

The coffeemaker industry has long been faced with the problem of providing a filter for coffeemakers that is satisfactory for all service conditions. While a number of different filters have been devised and used, they have not been entirely satisfactory in all respects. Some manufacturers have utilized a glass filter which comprises an elongated stem having an intermediate enlarged portion with a roughened surface shaped to seat in a throat portion at the bottom of the top vessel of the coffeemaker. This filter has been unsatisfactory because the roughened glass is hard to clean and frequently the filter, because it is quite fragile, breaks while it is being cleaned or otherwise handled. This is both an annoyance and an expense to the user of such coffeemakers. Some manufacturers have also utilized a filter employing a replaceable cloth or paper disc. Such a filter construction although very satsfactory requires in some cases that the filter cloth or paper be inserted in the vessel in a certain way and that the filter be assembled and disassembled each time the filter is cleaned. Other manufacturers have made still other types of filters but they have not been what might be considered the ultimate in filters for coffee makers because they have been complicated, have required disassembly for cleaning purposes and in many instances are difficult to thoroughly clean.

An object of this invention is the provision of a novel filter that may be readily cleaned without disassembling the filter.

Another object of the invention is the provision of a novel filter that is efficient, that is rugged and sturdy, that may be readily assembled in a coffeemaker, that assures the user of a long service life, that positively prevents undesirable leakage between the upper and lower vessel of the coffeemaker and that is relatively inexpensive to manufacture.

Other objects and advantages of the invention will become apparent from the following detailed description taken in connection with the accompanying drawings, in which—

Figure 1 is an elevational view of the upper vessel of a coffeemaker utilizing a filter embodying the present invention and having portions cut away to show details of construction;

Fig. 2 is a sectional view taken substantially along the line 2—2 of Figure 1;

Fig. 3 is a bottom view of the filter;

Fig. 4 is a sectional view taken substantially along the line 4—4 of Fig. 2;

Figure 5:
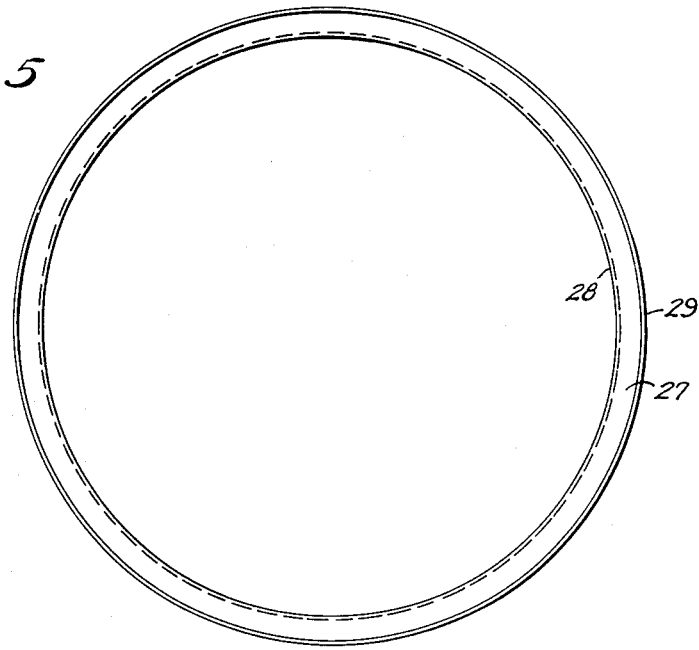
Fig. 5 is a plan view of the screen holder during an initial stage of its manufacture.
Figure 6:
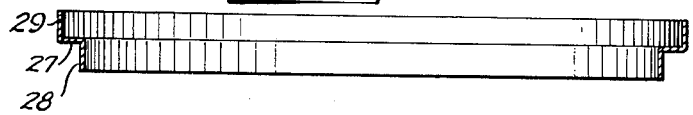
Fig. 6 is a sectional view of the screen holder shown in Fig. 5.

Referring now to the drawings, the invention is shown embodied in a filter for a coffeemaker, the upper vessel 11 of the coffeemaker only being shown to simplify the drawings. The upper vessel is of conventional construction and terminates in a well defined by a circular side wall 12 and a bottom 13. A tube 14 has its upper end connected to the bottom 13 as by spaced flanges 16 suitably mounted on the tube and engageable with opposite sides of the bottom 13. The lower end 17 of the tube is in spaced relation to the bottom 13 and is arranged to be received in the lower vessel (not shown) to provide communication between the upper and lower vessels. A gasket 18 is secured to the bottom of the vessel 11, as by a locknut 15 in a conventional manner, to insure a liquid-tight seal between the upper and lower vessels of the coffemaker when the upper vessel is seated on the lower vessel.

The filter comprises a screen 19, a screen holder 21, a frame 22 for supporting the screen 19 and screen holder 21 and an annular resilient member 23 shaped to maintain the screen holder 21 and frame 22 in assembled relation and shaped to effect a liquid-tight seal between the edges of the filter and the vessel 11 when the filter is positioned or seated in the vessel. As shown in this embodiment of the invention the screen 19 is of circular shape and is formed by the electro-deposition of metal material as described in U. S. Patent No. 2,166,366. Preferably the deposited metal is a copper-nickel alloy or other material having corrosive resistant characteristics. While the size of openings in the screen may vary considerably for filtering purposes, 150-200 mesh screen with 27 percent open area has been found satifsactory for filtering coffee. The thickness of the screen may also vary; however, screen measuring .0025 inch in thickness has been found satisfactory for the above purpose.

The screen holder or retainer 21 in this instance comprises a rim formed by spaced annular side members 24 and 26 interconnected at their outer edges by an annular bridging portion 27 and an annular flange 28 connected with an inner edge of the side member 26 and extending or curving outwardly therefrom to define with said side member an annular groove for a purpose to be described hereinafter. The sides 24 and 26 are shaped to grip the marginal or peripheral edge of the screen 19 and to hold the latter taut so that it is free of wrinkles.

Figure 7:
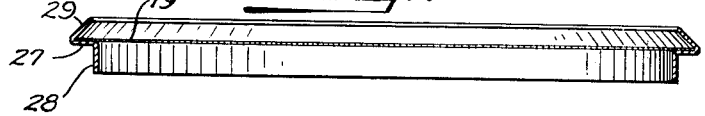
Fig. 7 shows the shape of the screen holder after the screen has been initially positioned in the holder and an end portion of the body has been partially deformed.
Figure 8:
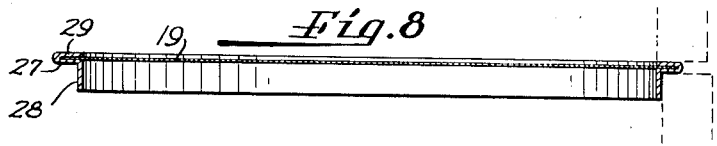
Fig. 8 shows the shape of the screen holder after one end portion thereof has been deformed into gripping engagement with the marginal edges of the screen.
Figure 9:
Fig. 9 shows the final form of the screen holder.

One method of forming the screen retainer to the above configuration is illustrated in Figs. 5, 6, 7, 8 and 9. An annular piece of metal such as aluminum is deformed by suitable dies (not shown) to define a body having an annular portion 27 with annular flanges 28 and 29 connected to the inner and outer edges thereof. The flange 28 extends axially outwardly from one side of the portion 27 while the flange 29 extends axially outwardly from the opposite side of the portion 27 so as to in effect define a sleeve having an annular radially extending shoulder formed intermediate its ends. The screen 19 is thereafter inserted in one end of the sleeve to have its marginal edges in face to face contact with the annular portion or shoulder 27. The assembly is then placed in suitable dies (not shown) to effect partial deformation of the outer flange 29, such as shown in Fig. 7. The assembly is then placed in another set of dies and the flange 29 is deformed into gripping engagement with the marginal edges of the screen 19 as shown in Fig. 8. As soon as the screen 19 is held firmly between the flange 29 and the annular portion 27 the latter are subjected to a rolling operation well known to those skilled in the art to increase the outside diameter, the purpose of this being to stretch the screen so that it is retained in a taut manner without wrinkles. The flange 28 is thereafter compressed or deformed to the configuration shown in Fig. 9 by suitable forming dies.

The frame 22 is best shown in Figs. 2 and 3 and comprises a hub portion 31 having spokes 32 extending radially outwardly therefrom. At their outer ends the spokes 32 are connected to a flat annular ring 33 of substantially the same diameter as the side members 24 and 26 of the screen holder. At positions intermediate the spokes are fingers 34 attached to the ring for reception in the well at the bottom of the vessel. The fingers have annularly spaced portions 36 extending radially inwardly from the ring 33 toward the hub portion 31 and portions 37 extending axially outwardly from the plane of the spokes. The portions 37 of each finger 34 are shaped to engage the side wall 12 of the well so as to guide the filter into position at the bottom of the vessel when the filter is seated in the coffeemaker. Preferably the extreme ends of the fingers 34 are curved as shown in Figure 1 to facilitate alignment of the portions 37 with the side wall 12.

The member 23 for retaining the frame 22 and the screen retaining member 21 in an assembled relation is best shown in Figs. 2 and 4. In general the retaining member is of an annular shape formed by resilient material such as rubber or synthetic rubber having an inwardly facing annular groove 39 shaped to receive the peripheral edges of the screen 19 and the screen holder 21. As shown in Fig. 4 when viewed in cross section the groove 39 is defined by spaced sides 41 and 42 interconnected at their outer peripheral edges. The sides are formed with projections 43 and 44 of tapering cross section and terminating in axially facing pointed edges. The projection 43 is shaped to be received in the groove defined by the side member 26 and the outwardly curving flange 28 to aid in retaining the parts in assembled relation. The projection 44 is shaped to seat on the lower wall of the vessel adjacent the well to provide a positive seal between the filter and the upper vessel at the outer edge of the filter, the resiliency of the rubber material of the annular member insuring that the projection 44 deforms to the configuration of the surface on the vessel which it engages.

The filter may be secured in position as by a conventional filter rod 46. As shown, the latter extends through an aperture 48 in the hub portion 31 of the frame and is formed at one end with a handle portion 47 and at its opposite end with a hook portion 49 shaped to hook over the extreme lower end 17 of the tube 14. A coil spring 51 embracing the filter rod 46 acts between the latter and the hub portion 31 through a washer 52 when the filter is seated in the vessel to exert a constant pressure on the filter and thereby force the projection 44 into sealing engagement with the bottom of the vessel 11.

To assemble the filter, the screen holder 21 and frame 22 are positioned in side by side relation and the annular member 23 is stretched to permit disposing the peripheral edges of the frame 22 and screen holder 21 in the annular groove 39 so that the sides 41 and 42 are disposed on opposite sides respectively of the screen holder 21 and the frame 22 to maintain the latter in tightly assembled relation. The filter rod 46 is passed through the opening 48 until the hub portion 31 engages a shoulder 54 on the rod 46. A spring 51 and washer 52 are next assembled on the filter rod and positioned so that the upper end 56 of the spring is received in a notch 58 formed on the rod adjacent the handle portion 47.

One of the advantages of this construction is that after it is initially assembled the filter does not have to be disassembled each time it is cleaned. This filter is also advantageous in that it may be readily cleaned. For example, to clean the filter it is only necessary to remove the filter from the coffeemaker vessel and place the filter as a unit under a running stream of tap water. As will be noted in Fig. 4 the top surface of the filter is free from all obstructions tending to maintain the coffee grounds on the filter and otherwise make it difficult to remove the coffee grounds from the filter. This filter in addition to being easy to assemble and clean is efficient, insures a positive seal between the upper vessel and the edges of the filter, thereby preventing undesirable leakage of coffee grounds or fluid between the upper and lower vessels during a coffee infusion operation. This is due to the fact that a constant pressure is being applied to the filter frame by the spring which urges the projection 44 into engagement with the vessel and the resiliency of the projection 44 insures that the latter will conform to the configuration of the vessel walls to prevent leakage. Moreover, this filter construction is rugged, requires a minimum of maintenance, and is relatively inexpensive to produce.

While I have shown one embodiment of my invention it will be understood that I do not wish to be limited thereto since many modifications may be made and I therefore contemplate by the claims to cover such modifications as fall within the true spirit and scope of my invention.

I claim:

1. A filter adapted to be forcibly seated in a coffeemaker vessel, comprising a metallic screen, means engageable with the marginal edges of the screen for maintaining the screen taut, a frame for supporting said metallic screen and said screen holding means, a readily removable annular member of resilient material having a recess for receiving the marginal edges of said frame and said screen holding means and operable to maintain them in assembled relation and an annular projection formed on one side of said resilient member shaped to engage the vessel to provide a fluid-tight seal between the vessel and the filter when the filter is seated in said vessel.

2. A filter adapted to be forcibly seated in a vessel, comprising a screen, screen holding means engageable with the marginal edges of the screen for maintaining the screen free of wrinkles, a frame for supporting said screen and said screen holding means, a readily removable annular rubber member having a recess for removably receiving the marginal edges of said frame and said screen holding means and operable to maintain them in assembled relation and an annular projection formed on one side of said rubber member having a tapering cross section terminating in a point spaced outwardly of one axial face of said member and shaped to engage the vessel to provide a fluid-tight seal between the vessel and the filter when the filter is seated in said vessel.

3. A filter adapted to be releasably secured in a vessel of a coffeemaker, comprising a metallic screen having a central aperture, means engageable with the marginal edges of the screen for maintaining it taut, a frame for supporting said metallic screen and said screen holding means and having a hub portion with an aperture, a readily removable annular member of resilient material having an annular recess for receiving the marginal edges of said frame and said screen holding means and operable to maintain them in assembled relation, an annular projection formed on one side of said resilient member shaped to engage the vessel to form a fluid-tight seal between the vessel and the peripheral edge of the filter, a filter rod shaped to extend through the holes in the screen and the hub portion having an end engageable with the vessel for securing the frame and screen holding means in the vessel and resilient means acting between said screen and said rod biased to store energy when the filter is seated in the vessel for urging said annular projection in fluid-tight engagement with the vessel.

4. A filter for a coffeemaker vessel having a well in the bottom, comprising a circular screen, a rim including spaced annular side members in gripping engagement with the marginal edges of the screen to maintain the latter taut and a flange connected with the inner edge of one of said side members and curving outwardly from said one side member from its juncture therewith, a frame comprising a hub portion, spokes extending radially outwardly from said hub portion, an annular ring portion attached to the outer ends of the spokes and shaped to be in side by side relation with one of the side members of said rim and fingers attached to said ring and shaped to engage the side walls of the well to position the screen in the vessel, and an annular resilient member having a recess on its inner face shaped to receive the marginal edges of the spaced side members of the rim and the ring portion of the frame to maintain them in assembled relation, said annular resilient member having a projection formed on one side shaped to be disposed between said flange and the adjacent side member of the rim and having a projection on its opposite side shaped to engage the vessel to form a liquid-tight seal between the filter and the vessel when the filter is secured in position in the vessel.

5. A filter of the type adapted to be forcibly seated in a vessel having a well formed on its bottom defined by a side wall, comprising a circular screen, a rim including spaced annular side members in gripping engagement with the marginal edges of the screen to maintain the latter taut and a flange connected with the inner edge of one of said side members and extending outwardly from said one side member from its connection therewith, a frame comprising a hub portion, annularly spaced spokes extending radially outwardly from said hub portion, an annular ring portion attached to the outer ends of the spokes and shaped to be in side by side relation with one of the side members of said rim and fingers attached to said ring and shaped to engage the side wall of the well to position the screen in the vessel, and an annular resilient member having a recess on its inner face shaped to receive the marginal edges of the spaced side members of the rim and the ring portion of the frame to maintain them in assembled relation, said annular resilient member having a first projection formed on one side and having a tapering cross section terminating in a pointed annular portion and shaped to be disposed between said flange and the adjacent side member of the rim and having a second projection on its opposite side and having a tapering cross section terminating in a pointed annular portion extending outwardly from one face of the resilient member and shaped to engage the vessel to form a liquid-tight seal between the filter and the vessel when the filter is seated in the vessel.

6. A filter for a coffeemaker vessel, comprising metallic screen, an annular rim comprising spaced members in gripping engagement with the marginal edges of the screen for maintaining the screen taut and a flange integral with the inner edge of one of said spaced portions and extending outwardly from the rim from its connection therewith, a spoked frame for supporting said rim having a ring portion in face to face contact with one of said spaced members of the rim and an annular rubber member having an annular groove on its inner face for receiving the spaced members of the rim and the ring portion of the frame, said member having a first annular projection on one side shaped to be adjacent the flange and engageable therewith to prevent accidental displacement of the annular member from the rim and frame and a second annular projection shaped to engage the vessel to form a liquid-tight seal between the rubber member and the vessel when the filter is positioned in the vessel.

References Cited in the file of this patent

UNITED STATES PATENTS

| | | |
|---|---|---|
| 1,714,468 | Espenchied | May 21, 1929 |
| 1,767,544 | Miller | June 24, 1930 |
| 1,777,369 | Jacobs | Oct. 7, 1930 |
| 2,027,406 | Spatta | Jan. 14, 1936 |
| 2,031,936 | Cuno | Feb. 25, 1936 |
| 2,127,397 | Freedlander | Aug. 16, 1938 |
| 2,225,758 | Stein | Dec. 24, 1940 |
| 2,345,265 | Jepson et al. | Mar. 28, 1944 |
| 2,433,271 | Grant | Dec. 23, 1947 |
| 2,451,074 | Dean | Oct. 12, 1948 |
| 2,472,955 | Myers | June 14, 1949 |
| 2,584,206 | Hodsdon | Feb. 5, 1952 |